J. J. & W. L. SPAIN.
DIFFERENTIAL APPLIANCE.
APPLICATION FILED JUNE 17, 1916.
1,236,222.
Patented Aug. 7, 1917.
2 SHEETS—SHEET 2.
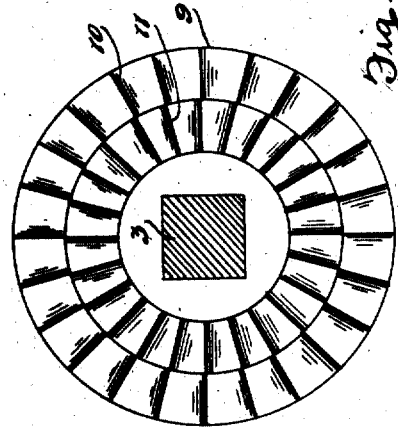
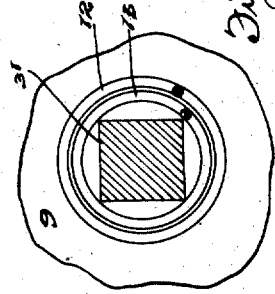
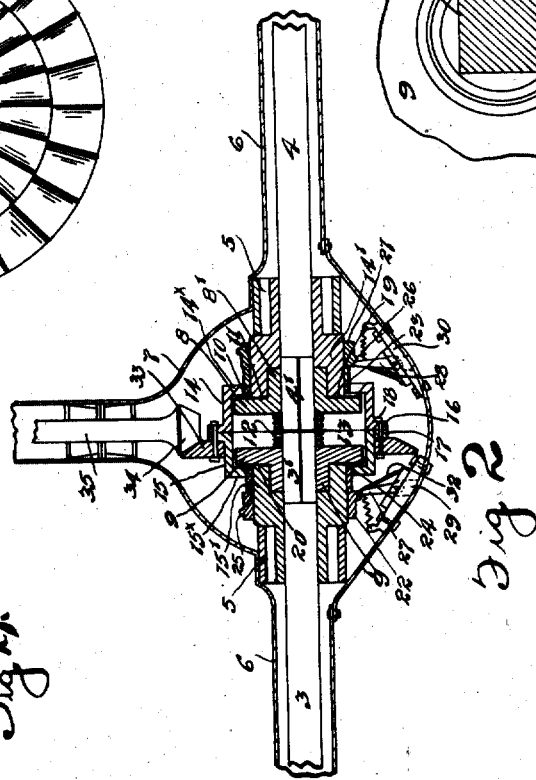
WITNESSES
INVENTORS
By
Attorneys

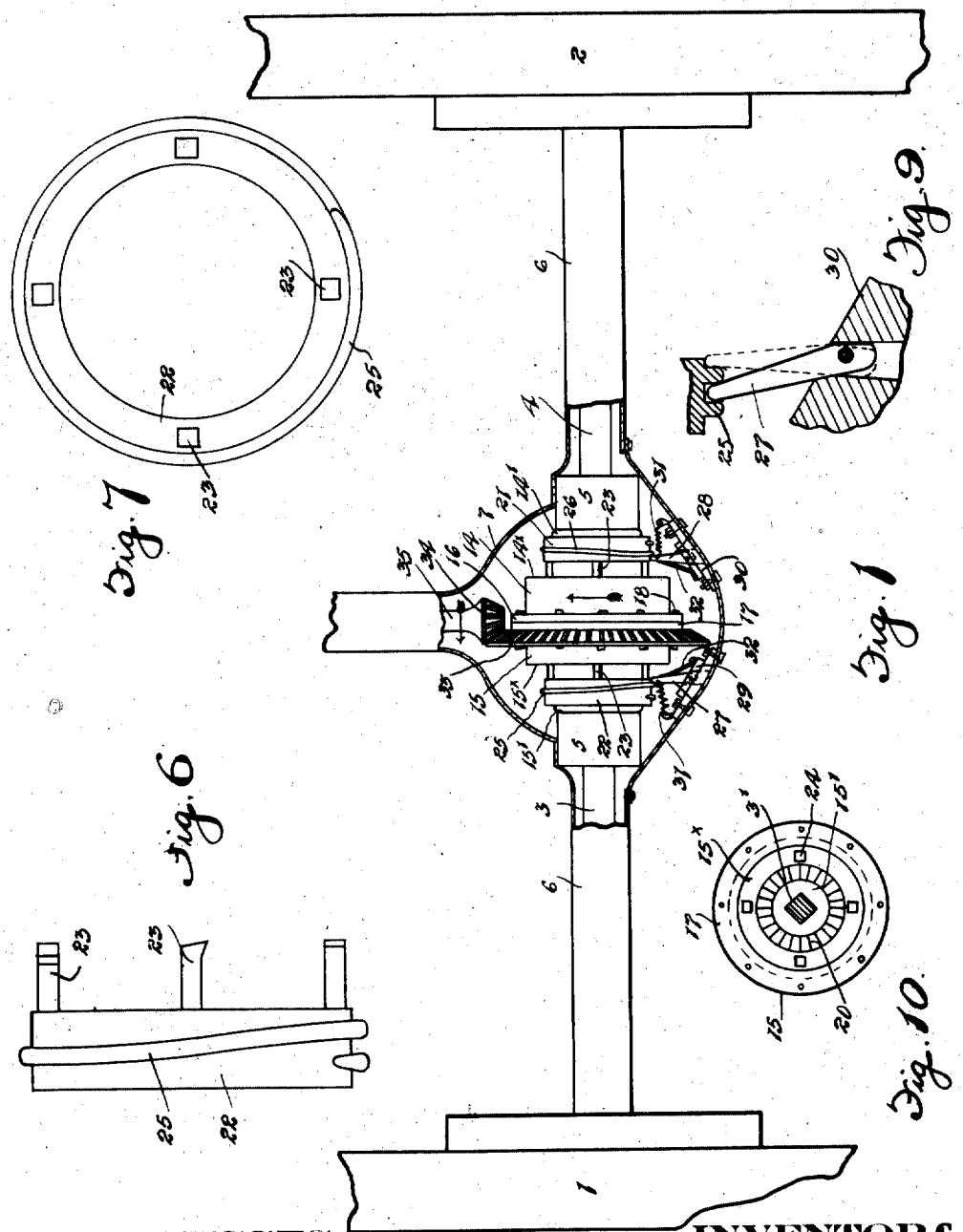

UNITED STATES PATENT OFFICE.

JOHN JOSEPH SPAIN AND WALTER LEO SPAIN, OF WINNIPEG, MANITOBA, CANADA, ASSIGNORS OF ONE-THIRD TO JOHN A. KNOTT, OF WINNIPEG, MANITOBA, CANADA.

DIFFERENTIAL APPLIANCE.

1,236,222.     Specification of Letters Patent.     Patented Aug. 7, 1917.

Application filed June 17, 1916. Serial No. 104,351.

*To all whom it may concern:*

Be it known that we, JOHN JOSEPH SPAIN and WALTER LEO SPAIN, both of the city of Winnipeg, in the Province of Manitoba, Canada, have invented certain new and useful Improvements in Differential Appliances, of which the following is the specification.

The invention relates to improvements in differential appliances especially designed for use in the propulsion of motor vehicles but adapted for other purposes and it consists essentially in the arrangement and construction of parts hereinafter described and later pointed out in the appended claims.

The objects of the invention are to provide simple and efficient means in connection with a divided axle for driving the axle sections positively at the same rate of speed and allowing neither section to overrun or turn at a higher rate of speed than the driving member; to allow each axle section to reengage with its driving member when the speed thereof falls to that at which its companion member is being driven; to allow both axle sections to disengage themselves from the driving power when coasting and reëngage when they have ceased to run faster than the driving member; to allow either or both of the axle sections to be turned freely in one direction when the wheels carried thereby are off the ground.

The above principal and other minor objects are attained by the mechanism illustrated in the accompanying drawings in which:—

Figure 1 represents a plan view of the operating parts, the containing casing being shown in horizontal section.

Fig. 2 represents a longitudinal sectional view through the casing and operating parts, the axle sections being shown in plan view.

Fig. 3 represents an enlarged detail vertical sectional view through the inner end of one of the axle sections and also through the pair of springs associated with the axle.

Fig. 4 represents an enlarged detail side view of one of the shiftable ratchet wheels.

Fig. 5 is a face view of the ratchet wheel shown in Fig. 4.

Fig. 6 is an enlarged detail side view of one of the shiftable engaging collars.

Fig. 7 is a face view of the collar shown in Fig. 6.

Fig. 8 is an enlarged detail side view of the collar shown in Fig. 6 but turned a quarter turn.

Fig. 9 is an enlarged detail vertical sectional view through one of the base blocks secured to the casing, the arm carried thereby being shown in side elevation.

Fig. 10 is an end view of one of the housing parts.

In the drawings like characters of reference indicate the corresponding parts of the several figures.

The axle which is adapted to carry the traction wheels indicated at 1 and 2 is of the divided type and consists of the sections 3 and 4 disposed in axial alinement and journaled in suitable bearings 5 provided in the tubular axle case 6. The meeting or adjacent ends of the axle sections are preferably squared as indicated at 3' and 4', these squared ends being utilized for a purpose later described.

The casing 7 inclosing the driving mechanism is somewhat globular in form and into this casing the squared ends of the axle sections extend.

On the squared ends of the axle sections we mount slidably right and left ratchet wheels 8 and 9 which have the hubs thereof projecting in sleeves 8' and 9' which sleeves embrace the axle sections and are supplied with open centers square in cross section.

The outer faces of the ratchet wheels are each supplied with outer and inner sets of ratchet teeth 10 and 11, the teeth 10 being disposed in an opposite direction to the teeth 11, that is to say the engaging faces of the teeth of one set stand in a direction opposite to that of the teeth in the other set.

While the sets of teeth in each ratchet wheel face in opposite directions, the teeth of the corresponding ratchets in both ratchet wheels face in the same direction; that is to say, the teeth 11 in each ratchet wheel which are the teeth from which the forward drive is effected, have their engaging faces standing in the same direction while the teeth 10 which are the reversing teeth have their engaging faces standing in the same direction.

The ratchet wheels are held pressed apart by the action of a pair of coiled springs 12 and 13 interposed between the inner faces of the wheels and disposed on the inner ends of the axle sections.

The ratchet wheels are inclosed within a two-piece housing comprising similar right and left parts 14 and 15 supplied with meeting flanges 16 and 17 which are fastened together by the bolts 18. The housing parts have their outer ends rotatably mounted on the shaft sections and contained within the bearings 5 and they have the body portions thereof fashioned to form sleeves 14′ and 15′ which receive the hubs of the ratchet wheels and also to provide side walls 14ˣ and 15ˣ disposed immediately opposite the outer sets of ratchet teeth in each instance.

The inner ends of the sleeves 14′ and 15′ are projected within the housing and are constructed to provide sets of ratchet teeth 19 and 20 one to each, which ratchet teeth are disposed immediately opposite the sets of ratchet teeth 11 with which latter teeth they mate.

On the sleeves 14′ and 15′ I mount sliding collars 21 and 22 which collars are each fitted with a plurality of similar equal-length concentrically arranged dogs 23 which dogs normally enter receiving openings 24 formed in the walls 14ˣ and 15ˣ of the housing and have their inner ends disposed directly opposite the outer ratchet teeth 10 with which they are adapted to engage.

In the carrying out of the invention it is necessary in the effecting of the reverse drive of either one or the other of the axle sections to shift these collars inwardly to engage the dogs with the outer sets of ratchet teeth of the ratchet wheels.

We accomplish this in the present instance by the parts now described.

Each of the collars is supplied with a spiral flange or rib indicated at 25 and 26, the ribs in the present instance being approximately one turn. The ribs are engaged in each instance by controlling arms 27 and 28, the controlling arms having their inner extremities bearing normally on the inner faces of the ribs and their outer extremities pivotally mounted in base blocks 29 and 30 permanently secured to the casing 7.

A spiral spring 31 and a flat spring 32 operate on the inner extremity of each of the controlling arms to press them normally against the inner face of the rib. The lower ends, that is to say the pivoted ends of the arms are constructed so that the free ends of the arms cannot swing in either direction farther than a predetermined amount, the inner limitation of the swing being restricted to the position shown in Fig. 1 of the drawings, while the outer limit of the swing is shown in Fig. 9 of the drawings. The reason for this will be apparent hereinafter.

To the flanges of the housing we secure the driving member on the appliance which consists of a hollow beveled gear 33.

Meshing with the gear 33 is a beveled pinion 34 located at the rear end of the drive shaft 35 which shaft can be driven in any suitable way such as by a motor.

The operation of the device is now described assuming that for forward driving purposes the shaft 35 is driven by the motor (not shown) in the direction indicated by the applied arrow in Fig. 1 and that for reverse drive the said shaft is rotated in the opposite direction.

In the forward driving of the shaft and in an instance such as where a motor vehicle is traveling straight along the road, the pinion 34 rotates the bevel gear 33 in a direction such that the housing is turned in the direction indicated by the arrow applied thereon in Fig. 1. In turning the housing, it carries with it the ratchet wheels owing to the fact that the ratchet teeth 19 and 20 are engaged with the sets of ratchet teeth 11, the engagements being assured by the action of the springs 12 and 13. The ratchet wheels in turning carry with them the axle sections with the result that the wheels 1 and 2 are both driven positively forward.

Obviously in the forward driving of the housing the collars 21 and 22 will be rotated on the sleeves 14′ and 15′ with the result that the spiral ribs will be turned. The ribs however, are spiral in such a direction that the controlling arms simply play freely on the inner sides of the ribs and effect no movement of the collars.

In the backing up of the vehicle, the driving shaft 35 produces a rotation of the housing in a direction opposite to that shown by the applied arrow in Fig. 1 which effects the slipping past of the ratchet teeth 19 and 20 on the sets of ratchet teeth 11. Coincident with this action it produces the reverse rotation of the collars, these being carried by the housing sections and as they turn they cause the controlling arms to pass to their outer limiting position which is at the outer sides of the spiral ribs. Consequently in the continued turning of the housing and collars the controlling arms compel the collars to move inwardly by operating on the outer faces of the ribs, the movement being such that the dogs are primarily engaged with the sets of teeth 10 and afterward push in the ratchet wheels to entirely clear the sets of teeth 11 from the teeth 19 and 20. Immediately the dogs engage with the series of the teeth 10 the ratchet wheels are rotated to rotate the axle sections in the reverse direction.

In rounding a curve the slow or inner wheel will be the one driven while the outer or fast wheel will be free as the outer axle section will be rotated by the outer wheel faster than the housing with the result that the ratchet teeth 11 will be running or escaping past the ratchet teeth 20. Obviously when the accelerated shaft section returns to the speed of its companion part, both the ratchet teeth 19 and 20 will be driving the axle sections.

It will be noted that when one wheel is running ahead of its driving power the other is carrying the load so that one wheel is being positively driven at all times, and further that should the inside wheel, which normally carries the load when rounding a curve, slip or lose traction sufficiently to cause it to spin or revolve at a rate of speed faster than the outside wheel, the load will be instantly shifted to the outside wheel which may have a firm traction grip on the road thereby preventing the vehicle losing traction, in any circumstance.

Attention is also called to the fact that when coasting, that is to say when either wheel is running ahead of the driving gear both of the ratchets 11 are free to slip past the slower moving ratchets 19 and 20.

It is also to be noted that should the wheels be entirely raised from the ground, as occurs when repairing the tires, the said wheels can be independently turned around in the forward direction as in this case the ratchet teeth 11 will turn with the rotated shaft section past the ratchet teeth of the sleeve.

What we claim as our invention is:—

1. In a differential appliance the combination with a divided axle formed from alined axle sections, a drive shaft and a casing receiving the drive shaft and axle sections, of a housing rotatably mounted on the meeting ends of the axle sections, a positive driving connection between the housing and the drive shaft, a pair of right and left wheels slidably mounted on the inner ends of the axle sections but rotatable with the same and contained within the housing, spring means interposed between the wheels and normally maintaining their outer faces pressed against the side walls of the housing, sets of normally engaged ratchet teeth formed on the engaging faces of the wheels and the housing, said ratchet teeth being adapted to effect the forward driving of the wheels with the housing and to permit of the escaping past of the teeth in the reverse rotation of the housing, outer sets of ratchet teeth on the wheels and arranged in the opposite direction to the former sets of teeth on said wheels, shiftable means carried by the housing and engageable with the outer sets of ratchet teeth, and means for effecting, in the reverse turning of the housing, the shifting of the latter means to effect its engagement with the outer ratchet teeth and the simultaneous disengagement of the inner sets of ratchet teeth.

2. In a differential appliance the combination with a divided axle formed from alined axle sections, a drive shaft and a casing receiving the drive shaft and axle sections, of a housing rotatably mounted on the meeting ends of the axle sections, a positive driving connection between the housing and the drive shaft, a pair of right and left wheels slidably mounted on the inner ends of the axle sections but rotatable with the same and contained within the housing, spring means interposed between the wheels and normally maintaining their outer faces pressed against the side walls of the housing, sets of normally engaged ratchet teeth formed on the engaging faces of the wheels and the housing, said ratchet teeth being adapted to effect the forward driving of the wheels with the housing and to permit of the escaping past of the teeth in the reverse rotation of the housing, outer sets of ratchet teeth on the wheels and arranged in the opposite direction to the former sets of teeth on said wheels, shiftable means mounted on the housing and engageable through the walls thereof with the outer sets of ratchet teeth and means for operating in the reverse rotation of the housing, the shiftable means to engage the same with the outer sets of ratchet teeth and simultaneously disengage the inner sets of ratchet teeth.

3. In a differential appliance the combination with a divided axle formed from alined axle sections, a drive shaft and a casing receiving the drive shaft and axle sections, of a housing rotatably mounted on the meeting ends of the axle sections, a positive driving connection between the housing and the drive shaft, a pair of right and left wheels slidably mounted on the inner ends of the axle sections but rotatable with the same and contained within the housing, spring means interposed between the wheels and normally maintaining their outer faces pressed against the side walls of the housing, sets of normally engaged ratchet teeth formed on the engaging faces of the wheels and the housing, said ratchet teeth being adapted to effect the forward driving of the wheels with the housing and to permit of the escaping past of the teeth in the reverse rotation of the housing, outer sets of ratchet teeth on the wheels and arranged in the opposite direction to the former sets of teeth on said wheels, collars slidably mounted on the housing and provided with extending concentrically arranged dogs projecting normally through the walls of the housing and disposed directly opposite the outer sets of ratchet teeth and means controlling the collars to effect the engagement of the dogs with the outer sets of ratchet teeth in the driving of the housing in the reverse direction.

4. In a differential appliance the combination with a divided axle formed from alined axle sections, a drive shaft and a casing receiving the drive shaft and axle sections, of a housing rotatably mounted on the meeting ends of the axle sections, a positive driving connection between the housing and the drive shaft, a pair of right and left wheels slidably mounted on the inner ends of the axle sections but rotatable with the same and contained within the housing, spring means interposed between the wheels and normally maintaining their outer faces pressed against the side walls of the housing, sets of normally engaged ratchet teeth formed on the engaging faces of the wheels and the housing, said ratchet teeth being adapted to effect the forward driving of the wheels with the housing and to permit of the escaping past of the teeth in the reverse rotation of the housing, outer sets of ratchet teeth on the wheels and arranged in the opposite direction to the former sets of teeth on said wheels, collars slidably mounted on the housing and provided with extending dogs normally entering the housing and disposed directly opposite the outer sets of ratchet teeth, a spiral rib formed on each of the collars, and spring controlling arms carried by the casing and operating on the ribs and adapted, in the reverse rotation of the housing, to effect the inward thrusting of the collars and the engagement of the dogs with the outer sets of ratchet teeth and the simultaneous disengagement of the inner sets of ratchet teeth.

Signed at Winnipeg, this 19th day of May, 1916.

JOHN JOSEPH SPAIN.
WALTER LEO SPAIN.

In the presence of—
G. S. BOXBAUGH,
ROLAND FOSTER.